United States Patent [19]

Burke

[11] Patent Number: 4,972,419

[45] Date of Patent: Nov. 20, 1990

[54] REGENERATIVE ULTRAVIOLET DRIVEN PHOTOCATHODE

[75] Inventor: Robert J. Burke, Thousand Oaks, Calif.

[73] Assignee: Rockwell International Corporation, El Segundo, Calif.

[21] Appl. No.: 413,812

[22] Filed: Sep. 28, 1989

[51] Int. Cl.$^5$ ............................................. H01S 3/00
[52] U.S. Cl. ......................................... 372/2; 372/74; 372/87
[58] Field of Search .................... 372/2, 69, 74, 87

[56] References Cited

U.S. PATENT DOCUMENTS

| | | | |
|---|---|---|---|
| 4,077,017 | 2/1978 | Gilson et al. | 331/94.5 PE |
| 4,641,103 | 2/1987 | Madey et al. | 328/228 |

OTHER PUBLICATIONS

Curtin et al., "First Demo of Free Electron Laser Driven by Electrons from a Laser Irradiated Photocathode", Proceed of Inter. Conf on Lasers 3/88.
First Demonstration of a Free-Electron Laser Driven by Electrons from a Laser Irradiated Photocathode–Mark Curtin, Glenn Bennett, Stephen Burke and J. J. Madey, Dec. 1, 1988, "Lasers 88", pp. 196–204.
Pulsed Photocurrents from Lanthum Hexaboride Cathodes in the ns Regime M. Boussoukaya, H. Bergert, R. Chehab and B. Leblond Nuclear Instruments and Methods in Physics Research A264 (Mar. 1988), pp. 131–134.

Primary Examiner—Léon Scott, Jr.
Attorney, Agent, or Firm—H. Fredrick Hamann; Harry B. Field; Steven E. Kahm

[57] ABSTRACT

A device to provide high current, low emittance electron beams with a long life cathode. The device consists of an undulator 7 which provides a source of ultraviolet light 15 for an ultraviolet photocathode 8. The undulator 7 needs a supply of electrons to produce the ultraviolet light which it can get by diverting a portion of a beam from a linear accelerator 3 before $E_3$ or after $E_4$ the electron beam traverses a free electron laser 5. The device is self-maintaining once a source of electrons is developed but needs a start-up source of electrons. The start up source can be provided by a pulsed cathode electron gun 1 which has to be on for a short period of time until the ultraviolet photocathode 8 is operated. Alternatively, the start-up source can be achieved by irradiating the UV photocathode 8 by ultraviolet light from a conventional laser 9, which can be aimed through the undulator 7 and subsequently provide a seed UV laser beam at lower power to assist regeneration of the high power UV beam in the undulator. In another embodiment UV light 15 can be sent directly from the free electron laser 5 to ultraviolet photocathode 8.

16 Claims, 2 Drawing Sheets

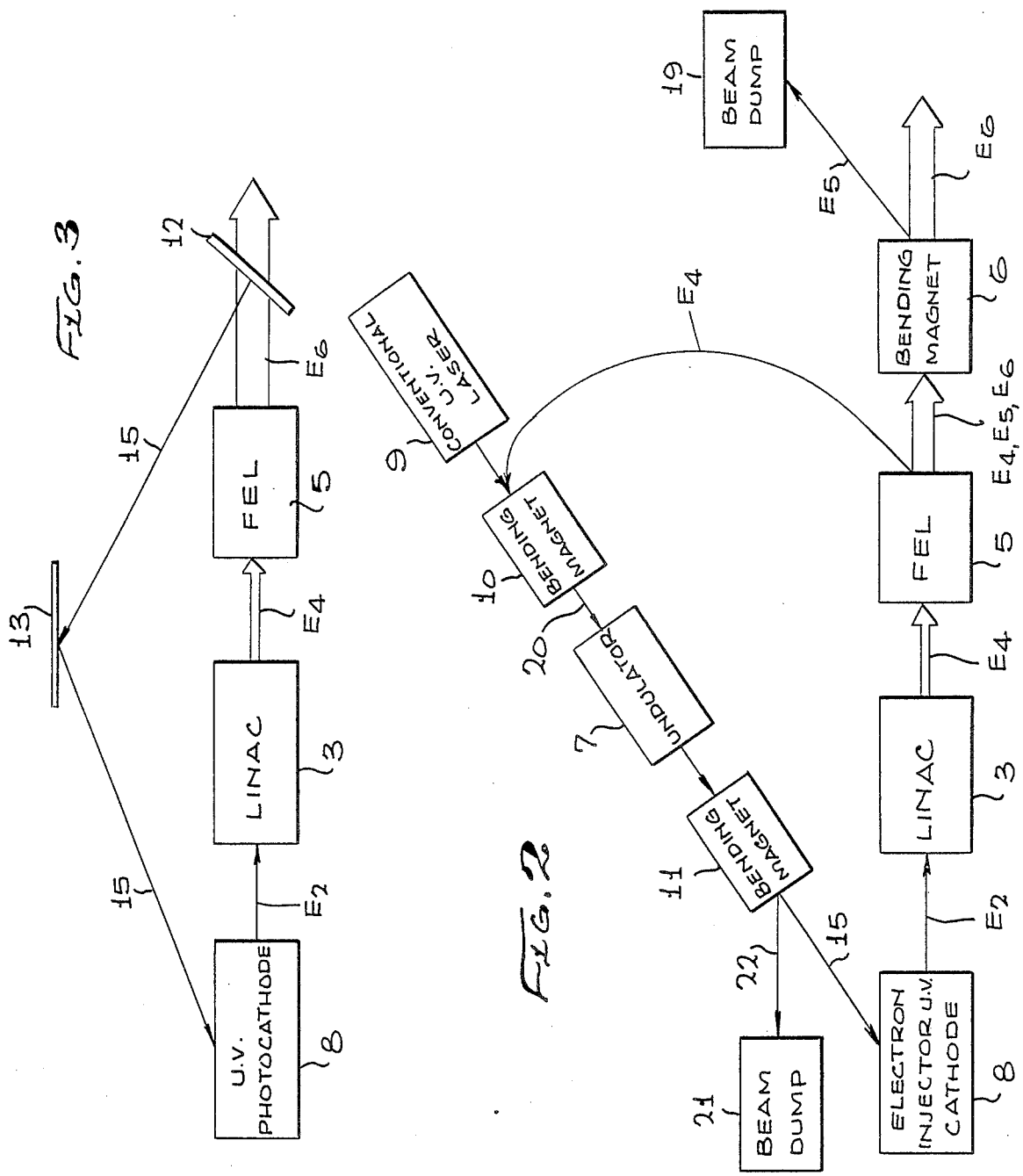

REGENERATIVE ULTRAVIOLET DRIVEN PHOTOCATHODE

FIELD OF THE INVENTION

This invention relates to the creation of high peak and average current, low emittance electron beams for high power free electron lasers.

BACKGROUND OF THE INVENTION

A free electron laser needs a source of electrons with high current and low emittance. Cathodes using the photoelectric effect are recognized as superior for these ends compared to cathodes using thermal emission. Development of photocathodes suitable for free electron lasers has tended to concentrate on cathode materials that emit efficiently with visible light. This requires complex cathode materials that tend to be incompatible with accelerators which use high voltage gradients and also tend to be short lived. The alternative is to use ultraviolet light to achieve photoemission from simple cathode materials. High photoelectric efficiency is well known from common metals such as copper, molybdenum, vanadium, tantalum and tungsten when irradiated by ultraviolet light with photon energy of approximately 12 electron volts or more. The limiting factor in producing enough electrons has been the intensity of the ultraviolet light. No sources of ultraviolet light commonly available could produce enough electrons to meet the requirements of a high power free electron laser.

A 40 watt source of deep ultraviolet light can generate enough current from a common metal cathode to pump a high power free electron laser.

SUMMARY OF THE INVENTION

This invention relates to a source of high current, low emittance electron beams for use with free electron lasers or other devices needing such beams. Deep ultraviolet light is used to drive an efficient photocathode to produce the electron beams. The ultraviolet light can be produced in an undulator or come directly from the output of the free electron laser.

In one embodiment a start-up cathode is used for an initial supply of electrons. Then an undulator receiving high energy electrons can produce ultraviolet light for driving an ultraviolet photocathode which will supply electrons to the free electron laser.

A second embodiment uses an ultraviolet laser directed at the ultraviolet cathode for a start-up source of electrons.

In a third embodiment either start-up source may be used, however the undulator can be eliminated if the free electron laser produces ultraviolet light which is directed to the ultraviolet photocathode.

An ultraviolet photocathode using a common metal cathode can provide the high current, low emittance electron beam over a long life for a free electron laser or other devices that use electron beams. The ultraviolet driven photocathode using a common metal cathode will have a long life.

Another advantage of the ultraviolet driven photocathode is its efficiency.

A further advantage is it is easy to control the electron output which is directly proportional to the ultraviolet light irradiating its surface. Electrons will be given off immediately when the ultraviolet light impacts the cathode, and stop immediately when the light stops.

BRIEF DESCRIPTION OF THE DRAWINGS

FIG. 2 shows a block diagram of the regenerative ultraviolet driven photocathode with an ultraviolet laser start-up source.

FIG. 3 shows a block diagram of the regenerative ultraviolet driven photocathode receiving outcoupled ultraviolet light from the free electron laser.

DETAILED DESCRIPTION OF THE PREFERRED EMBODIMENT

Figure 1:
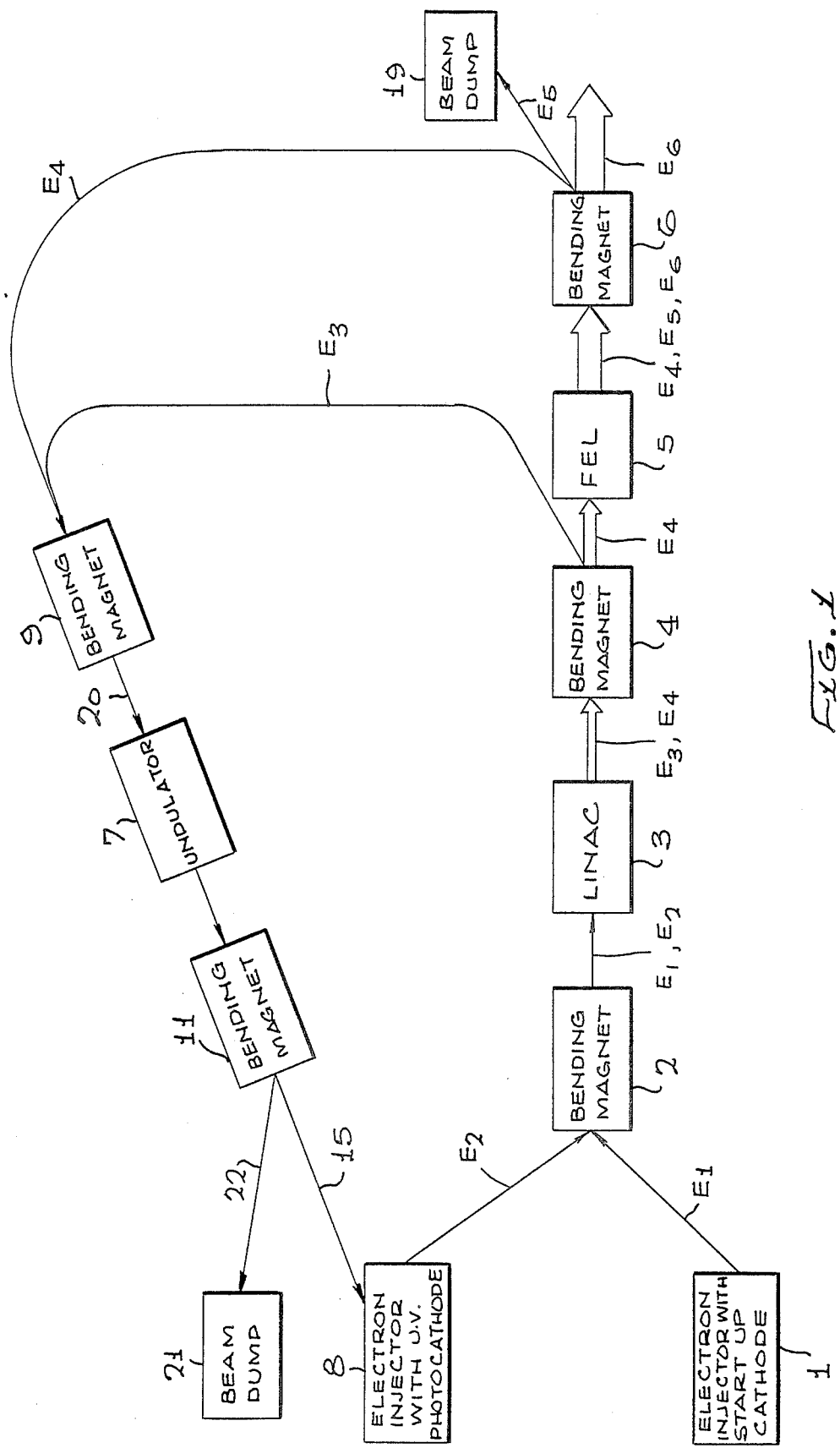
FIG. 1 shows a block diagram of the regenerative ultraviolet driven photocathode with a start-up cathode.

FIG. 1 shows a free electron laser having two sources of electrons. There is a start-up electron injector 1, having a cathode and an electron gun, to supply the initial electrons to commence operations and an electron injector 8, having an ultraviolet photocathode and an electron gun, for a continuous supply of electrons after start-up.

The start-up electron injector 1 which may use either a thermionic cathode or a photocathode supplies electrons which are accelerated by an electron gun that is part of the start-up electron injector represented by block 1. The start-up cathode is operated on a pulsed basis for the start-up period of the free electron laser. The electrons from the start-up cathode exit the electron gun with energy $E_1$ and are directed to bending magnet 2. Bending magnet 2 directs the electrons onto the center line of linear accelerator 3.

There are limits to the quality, peak current, brightness, average current, pulse format and micropulse structure of electrons produced thermally or by photoemission in pulsed mode from the start-up cathode 1. Therefore it is only used for approximately 10 microseconds to start the system.

The linear accelerator increases the energy of the electrons in the beam from the electron injector with the start-up cathode 1 to $E_3$. Bending magnets 4 and 9 divert electrons of energy $E_3$ to the undulator 7.

Ultraviolet photons 20 are produced in the undulator 7 which, when directed to the photocathode, begin photoemission from the ultraviolet photocathode in electron injector B. Electrons leaving injector B with energy $E_2$ are diverted onto the center line of linac 3 by bending magnet 2.

Electrons with energies $E_1$ and $E_2$ are diverted from different beam lines onto the common center line of the linear accelerator 3 by virtue of different orbit curvatures inside bending magnet 2. These electrons are accelerated to energy $E_3$ and $E_4$ respectively by the linear accelerator 3 and diverted to different beam lines by virtue of their different orbit curvatures inside bending magnet 4.

The free electron laser 5 superimposes beams of relativistic electrons $E_4$ and intense laser radiation to produce coherent radiation $E_6$ via stimulated magnetic brehmstrahlung. Electrons that yield energy to the laser beam leave the free electron laser 5 with energy $E_5$ and are diverted by bending magnet 6 to beam dump 19. Electrons not engaged in the free electron laser process leave the free electron laser with energy $E_4$, the entrance energy, and are diverted by bending magnet 6 into a beam line toward bending magnet 9, which directs the beam onto the center line of undulator 7. The diverted electrons from $E_4$ are from the portion of the electron beam that maintains high brightness as a result of not interacting with the light beam in the free electron laser.

Electrons of energies $E_3$ and $E_4$ are diverted from different beam lines onto the common center line of undulator 7 by virtue of their different orbit curvatures inside bending magnet 9.

Once there is a supply of enough high energy electrons $E_3$ or $E_4$ available to supply the undulator 7, the undulator can produce 40 watts of high intensity ultraviolet light 20, which when incident on the ultraviolet photocathode produces a stream of high current, low emittance electrons $E_2$ to supply the free electron laser.

There are a number of advantages to using an undulator to supply ultraviolet light to the photocathode for producing an electron supply for the free electron laser. Since the photoelectric effect produces electrons almost instantaneously in proportion to the light incident on the photocathode, the intervals, duration and current of the electrons leaving the photocathode can be accurately controlled. The ultraviolet photocathode B can produce a sustained high peak current, low emittance, high brightness, high average current with good pulse microstructure.

A further advantage for using deep ultraviolet light with photon energy of approximately 12 to 15 electron volts on a photocathode is that materials such as copper, molybdenum, vanadium, tantalum or tungsten can be used to achieve high photoelectric emission efficiency. These materials are compatible with the accelerator environment and can withstand the high intensity ultraviolet radiation of the undulator and have a long life.

In an alternate embodiment as shown in FIG. 2 the start-up portion of the system can be accomplished by employing a conventional ultraviolet laser 9 which when incident on the ultraviolet photocathode 8 creates a large enough supply of electrons to start-up the system.

In this embodiment bending magnet 10 aligns electron beam 20 with the undulator 7 and bending magnet 11 diverts the electron beam 22 emerging from the undulator to a beam dump 21. The ultraviolet light 15 is not affected by bending magnet 11 and strikes the ultraviolet cathode 8 providing electrons for the system.

When the start-up phase is over the ultraviolet driven photocathode device is self-sustaining in long pulse or continuous operation.

The conventional ultraviolet laser can be operated in a high power mode for the start-up period and subsequently in a low power mode to provide a seed ultraviolet beam to the undulator for the long pulse or continuous operation.

In FIG. 3 a third embodiment is shown. After the device is started by either start-up method disclosed above it is possible by satisfying the free electron laser design requirements to provide ultraviolet light 15 directly from the free electron laser 5, to the ultraviolet photocathode 8, thereby eliminating the need for the undulator 7 in embodiments 1 and 2.

The free electron laser may provide the ultraviolet radiation if operated at a suitable combination of electron energy and other design parameters. Then an outcoupling device 12 and mirror 13 can direct either a portion of the fundamental free electron laser wavelength radiation or a higher harmonic of the free electron laser light directly to the ultraviolet photocathode B.

What is claimed and desired to be secured by letters patent of the United States is:

1. In a free electron laser, a regenerative ultraviolet driven photocathode means comprising:
an undulator receiving electrons and producing a high intensity ultraviolet light source, which drives an ultraviolet photocathode to emit a high current, low emittance electron beam; a linear accelerator accelerates the electrons from the ultraviolet photocathode, thereby supplying electrons for a free electron laser.

2. In a free electron laser a regenerative ultraviolet driven photocathode as in claim 1 where the undulator is supplied with electrons from the linear accelerator.

3. In a free electron laser a regenerative ultraviolet driven photocathode as in claim 2 where a pulsed start-up cathode is used to supply a stream of electrons to the linear accelerator to start the regenerative ultraviolet driven photocathode.

4. In a free electron laser a regenerative ultraviolet driven photocathode as in claim 3 where a bending magnet is used to direct the electrons from the ultraviolet photocathode and the start-up cathode to the linear accelerator.

5. In a free electron laser a regenerative ultraviolet driven photocathode as in claim 4 where a bending magnet is used to direct electrons from the linear accelerator to the undulator.

6. In a free electron laser a regenerative ultraviolet driven photocathode as in claim 2 where a conventional ultraviolet laser irradiates the surface of the ultraviolet photocathode to supply a stream of electrons to the linear accelerator for starting up the regenerative ultraviolet driven photocathode.

7. In a free electron laser a regenerative ultraviolet driven photocathode as in claim 6 where a conventional laser operating at a high power level irradiates the ultraviolet photocathode to supply a stream of electrons to the linear accelerator to start the regenerative ultraviolet driven photocathode and where the conventional laser thereafter operating at a reduced power level supplies a seed ultraviolet laser beam to the undulator to sustain the regenerative ultraviolet driven photocathode.

8. In a free electron laser a regenerative ultraviolet driven photocathode as in claim 1 where the undulator is supplied with electrons from the free electron laser.

9. In a free electron laser a regenerative ultraviolet driven photocathode as in claim 8 where a pulsed start-up cathode is used to supply a stream of electrons to the linear accelerator to start the regenerative ultraviolet driven photocathode.

10. In a free electron laser a regenerative ultraviolet driven photocathode as in claim 9 where a bending magnet is used to direct the electrons from the ultraviolet photocathode and the start-up cathode to the linear accelerator.

11. In a free electron laser a regenerative ultraviolet driven photocathode as in claim 10 where a bending magnet is used to direct electrons from the free electron laser to the undulator.

12. In a free electron laser a regenerative ultraviolet driven photocathode as in claim 8 where a conventional ultraviolet laser irradiates the surface of the ultraviolet photocathode to supply a stream of electrons to the linear accelerator for starting up the regenerative ultraviolet driven photocathode.

13. In a free electron laser a regenerative ultraviolet driven photocathode as in claim 12 where a conventional laser operating at a high power level irradiates the ultraviolet photocathode to supply a stream of electrons to the linear accelerator to start the regenerative ultraviolet driven photocathode and where the conventional laser thereafter operating at a reduced power level supplies a seed ultraviolet laser beam to the undulator to sustain the regenerative ultraviolet driven photocathode.

14. In a free electron laser a regenerative ultraviolet driven photocathode means comprising, an ultraviolet photocathode which provides electrons which are directed to a linear accelerator, where the electrons are accelerated and directed to a free electron laser, ultraviolet light from the free electron laser output is outcoupled and directed to the ultraviolet photocathode.

15. In a free electron laser a regenerative ultraviolet driven photocathode as in claim 14 where a start-up cathode is used to supply a stream of electrons to the linear accelerator to start the regenerative ultraviolet driven photocathode.

16. In a free electron laser a regenerative ultraviolet driven photocathode as in claim 14 where a conventional ultraviolet laser is used to irradiate the ultraviolet photocathode to supply a stream of electrons to the linear accelerator to start the regenerative ultraviolet driven photocathode.

* * * * *